United States Patent
Harris

(10) Patent No.: US 10,090,919 B2
(45) Date of Patent: Oct. 2, 2018

(54) METHOD AND APPARATUS FOR LOGGING TRANSIENT EVENTS OF AN OPTICAL FIBER SPAN WITHIN A FIBER OPTIC SYSTEM

(71) Applicant: ADVA Optical Networking SE, Meiningen OT Dreissigacker (DE)

(72) Inventor: Richard Harris, Lawrenceville, GA (US)

(73) Assignee: ADVA OPTICAL NETWORKING SE, Meiningen-Dreissigacker (DE)

( * ) Notice: Subject to any disclaimer, the term of this patent is extended or adjusted under 35 U.S.C. 154(b) by 91 days.

(21) Appl. No.: 15/236,138

(22) Filed: Aug. 12, 2016

(65) Prior Publication Data
US 2018/0048385 A1 Feb. 15, 2018

(51) Int. Cl.
| | | |
|---|---|---|
| *H04B 10/00* | (2013.01) | |
| *H04B 10/079* | (2013.01) | |
| *H04L 12/24* | (2006.01) | |
| *H04J 14/00* | (2006.01) | |

(52) U.S. Cl.
CPC ..... *H04B 10/0795* (2013.01); *H04B 10/0791* (2013.01); *H04B 10/07953* (2013.01); *H04L 41/064* (2013.01)

(58) Field of Classification Search
CPC .... H04B 10/07; H04B 10/075; H04B 10/077; H04B 10/0771; H04B 10/0775; H04B 10/079; H04B 10/0791; H04B 10/0195; H04B 10/07955
See application file for complete search history.

(56) References Cited

U.S. PATENT DOCUMENTS

| | | | |
|---|---|---|---|
| 2010/0226644 A1 | 9/2010 | Ito et al. | |
| 2012/0207469 A1* | 8/2012 | Tanaka | H04B 10/0775 398/33 |
| 2013/0202289 A1* | 8/2013 | Tang | H04B 10/07 398/17 |
| 2014/0158867 A1* | 6/2014 | Itoh | H04B 10/07955 250/214 LA |

OTHER PUBLICATIONS

Extended European Search Report for European Patent Application No. 17153505.7 (dated Jul. 24, 2017).

* cited by examiner

*Primary Examiner* — Daniel Dobson
(74) *Attorney, Agent, or Firm* — Jenkins, Wilson, Taylor & Hunt, P.A.

(57) ABSTRACT

A method and apparatus for logging transient events of an optical fiber span within a fiber optic system, the method comprising the steps of sampling measured values of at least one signal parameter of an optical signal transported through said optical fiber span, OFS; processing the sampled measurement values to detect an occurrence of a transient event during transport of the optical signal through said optical fiber span, OFS; and providing each detected transient event with a time stamp for correlation with other monitored events within said fiber optic system.

16 Claims, 7 Drawing Sheets

METHOD AND APPARATUS FOR LOGGING TRANSIENT EVENTS OF AN OPTICAL FIBER SPAN WITHIN A FIBER OPTIC SYSTEM

TECHNICAL FIELD

Background

In a conventional fiber optic system, fiber optic terminals FOTs can be connected to each other by means of optical fiber spans OFS. A fiber optical link can comprise one or multiple fiber optical spans each comprising at least one optical fiber. The optical fiber spans of the fiber optic system can be routed in underground conduits or hung on telephone or power poles. Further, the optical fiber spans can in some country or city be laid on top of the ground or even across of rooftops of houses or through trees. Each fiber span comprises an associated steady state span loss largely dependent on span length, fiber type as well as fiber splices within the optical fiber span. It may happen that these optical fiber spans experience loss transients of short duration especially when the optical fibers have been promiscuously routed between fiber optical terminals of the fiber optic system. During such a transient event, a span loss within an optical fiber span can increase significantly the steady state span loss. This negatively impacts the receivers in the fiber optic terminals causing degradation in performance for the duration of the span loss transient event.

Accordingly, there is a need to provide a method and apparatus for logging transient events of an optical fiber span within a fiber optic system.

SUMMARY OF THE INVENTION

The invention provides according to a first aspect a method for logging transient events of an optical fiber span within a fiber optic system,
the method comprising the steps of:
sampling measured values of at least one signal parameter of an optical signal transported through said optical fiber span,
processing the sampled measurement values to detect an occurrence of a transient event during transport of the optical signal through said optical fiber span and
providing each detected transient event with a time stamp for correlation with other monitored events within the fiber optic system.

In a possible embodiment of the method according to the first aspect of the present invention, the detected transient event comprises a span loss transient event of the optical fiber span.

In a still further possible embodiment of the method according to the first aspect of the present invention, the span loss transient event of the optical fiber span comprises an optical power transient event of the optical fiber span.

In a further possible embodiment of the method according to the first aspect of the present invention, the measured signal parameter of the optical signal transported through said optical fiber span comprises an optical signal power of the optical signal.

In a further possible embodiment of the method according to the first aspect of the present invention, the measured signal parameter of the optical signal transported through said optical fiber span comprises a polarization of the optical signal.

In a still further possible embodiment of the method according to the first aspect of the present invention, the measured signal parameter of the optical signal transported through said optical fiber span comprises a signal-to-noise ratio SNR of the optical signal transported through said optical fiber span, and/or a Q-factor and/or an optical power span loss, SL.

In a further possible embodiment of the method according to the first aspect of the present invention, the signal parameter of an optical signal transported through said optical fiber span from a transmitting fiber optic terminal connected to a first end of said optical fiber span to a receiving fiber optic terminal connected to a second end of said optical fiber span is measured continuously at the transmitting fiber optic terminal and/or at the receiving fiber optic terminal to provide sampled signal parameter values of the transmitted and/or received optical signal.

In a further possible embodiment of the method according to the first aspect of the present invention, a signal parameter is calculated continuously by subtracting the current sampled signal parameter value of the received optical signal from the sampled current signal power value of the transmitted optical signal.

In a still further possible embodiment of the method according to the first aspect of the present invention, a signal parameter difference is determined continuously by comparing a previous signal parameter value from a current signal parameter value.

In a still further possible embodiment of the method according to the first aspect of the present invention, if a predetermined number of consecutively determined signal parameter differences is lower than a signal parameter difference threshold a steady state signal parameter is computed on the basis of the consecutively determined signal parameters.

In a further possible embodiment of the method according to the first aspect of the present invention, a leading edge transient event is detected if the determined signal parameter difference exceeds the signal parameter difference threshold from the steady state signal parameter.

In a further possible embodiment of the method according to the first aspect of the present invention, following a leading edge transient event a trailing edge transient event is detected if the calculated difference between the computed steady state signal parameter and the current signal parameter is lower than the signal parameter difference threshold.

In a further possible embodiment of the method according to the first aspect of the present invention, the leading edge transient event and/or the trailing edge transient event are automatically time-stamped using a fiber optic terminal clock.

In a further possible embodiment of the method according to the first aspect of the present invention, the time-stamped transient events are stored in a non-volatile memory.

In a still further possible embodiment of the method according to the first aspect of the present invention, the time-stamped transient events are correlated with each other and/or with other time-stamped events observed within the fiber optic system to find a root cause of a short-term fault having occurred in the fiber optic system.

In a still further possible embodiment of the method according to the first aspect of the present invention, the other observed time-stamped events comprise bit error rate degradation events.

In a still further possible embodiment of the method according to the first aspect of the present invention, the other observed time-stamped events comprise Q-factor degradations.

The invention provides according to a second aspect an apparatus for logging transient events of an optical fiber span within a fiber optic system,
said apparatus comprising:
a sampling unit adapted to sample measured values of at least one signal parameter of an optical signal transported through said optical fiber span;
a processing unit adapted to process the sampled measurement values to detect an occurrence of a transient event during transport of the optical signal through said optical fiber span; and
a time-stamping unit adapted to provide each detected transient event with a time stamp for correlation with other monitored events within said fiber optic system.

The invention further provides according to a third aspect a fiber optic system comprising at least one apparatus configured to log transient events of an optical fiber span within the fiber optic system according to the second aspect of the present invention,
said apparatus comprising:
a sampling unit adapted to sample measured values of at least one signal parameter of an optical signal transported through said optical fiber span,
a processing unit adapted to process the sampled measurement values to detect an occurrence of a transient event during transport of the optical signal through said optical fiber span and
a time-stamping unit adapted to provide each detected transient event with a time stamp for correlation with other monitored events within said fiber optic system.

In a possible embodiment of the fiber optic system according to the third aspect of the present invention, the fiber optic system comprises a non-volatile memory adapted to store the time-stamped transient events of an optical fiber span output by said time-stamping unit and to store other time-stamped events observed within the same fiber optic system.

In a still further possible embodiment of the fiber optic system according to the third aspect of the present invention, the fiber optic system comprises an analyzing apparatus having a calculation unit adapted to correlate the time-stamped transient events of the optical fiber spans with each other and/or with other observed time-stamped events within said fiber optic system to detect a root cause of a short-term fault having occurred in the fiber optic system.

BRIEF DESCRIPTION OF DRAWINGS

In the following, possible embodiments of the different aspects of the present invention are described in more detail with reference to the enclosed figures.

DETAILED DESCRIPTION OF EMBODIMENTS

Figure 1:
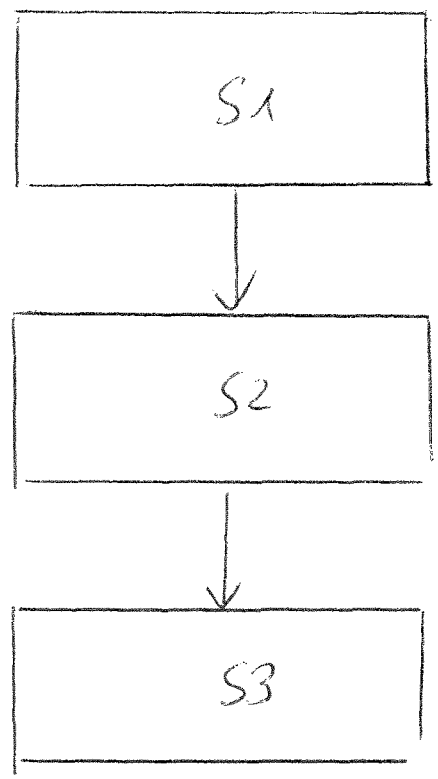
FIG. 1 shows a flowchart of a possible exemplary embodiment of a method for logging transient events of an optical fiber span within a fiber optic system according to the first aspect of the present invention.

As can be seen in the flowchart of FIG. 1, a method for logging transient events of an optical fiber span within a fiber optic system according to the first aspect of the present invention comprises in the illustrated embodiment several steps S1, S2, S3.

In a first step S1, measured values of at least one signal parameter of an optical signal transported through an optical fiber span OFS are sampled. The measured signal parameter of the optical signal transported through the optical fiber span can comprise in a possible implementation an optical signal power of the respective optical signal. In a further possible embodiment, the measured signal parameter of the optical signal transported through the optical fiber span of the fiber optic system can comprise another parameter comprising a polarization of the optical signal and/or a signal-to-noise ratio, SNR, and/or an optical signal Q-factor of the optical signal and/or an optical power span loss, SL.

In a further step S2, the sampled measurement values are processed to detect an occurrence of a transient event during transport of the optical signal through the optical fiber span OFS.

In a further step S3, each detected transient event is provided with a time stamp TS which can be used for correlation with other monitored events within the fiber optic system. In a possible embodiment, the detected transient event can comprise a span loss transient event of the optical fiber span OFS. This span loss transient event of the optical fiber span can comprise an optical power transient event of the respective optical fiber span.

In a possible preferred embodiment, the measured optical signal power of an optical signal transported through the optical fiber span from a transmitting fiber optic terminal FOT connected to a first end of the optical fiber span OFS to a receiving fiber optic terminal FOT connected to a second end of the fiber optic span OFS is measured continuously at the transmitting fiber optic terminal and/or at the receiving fiber optic terminal to provide in step S1 sampled optical power values of the transmitted and/or received optical signal. The transmitting fiber optic terminal and the receiving fiber optic terminal can communicate with each other in a possible embodiment by means of an optical supervisory channel OSC. In a still further possible alternative embodiment, the transmitting fiber optic terminal and the receiving fiber optic terminal can communicate with each other by means of an embedded communication channel ECC.

Figure 2:
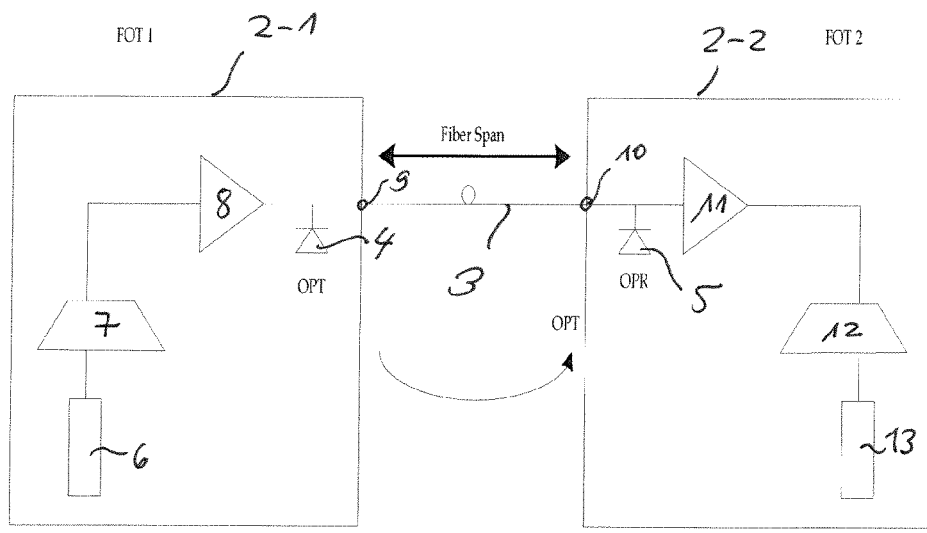
FIG. 2 shows a schematic diagram of a fiber optic system comprising two fiber optic terminals to illustrate the operation of a method and apparatus for detecting transient span loss events within a fiber optic system.

FIG. 2 shows schematically a block diagram of a possible exemplary embodiment of a fiber optic system 1 according to an aspect of the present invention comprising a first transmitting fiber optic terminal 2-1 connected to a receiving fiber optic terminal 2-2 via an optical fiber span 3. The optical fiber span 3 can comprise one or several optical fibers each adapted to transport optical channels with different optical wavelengths λ. The optical fiber of the optical fiber span 3 can for instance comprise 40 optical channels, 80 optical channels, 120 optical channels and even more optical channels for transporting optical signals from the transmitting fiber optic terminal 2-1 to the receiving fiber optic terminal 2-2. The transmitting fiber optical transceiver 2-1 and the receiving fiber optical transceiver 2-2 each comprise for each channel a transceiver which can be integrated in a transponder. With the method as illustrated in the flowchart of FIG. 1, it is possible to capture, measure and store span loss transient events on a fiber optic terminal 2 in a manner that allows correlation between span loss transient events and other FOT receiver degradation events.

When the optical channels are launched into an optical fiber of the optical fiber span 3, a total optical power transmitted OPT can be measured by means of an optical power detector 4 at the fiber optic terminal 2-1 transmitting the optical signal as illustrated in FIG. 2. Similarly, on the far end of the optical fiber span 3, a total optical power received OPR can be measured by an optical power detector 5 of the receiving fiber optic terminal 2-2.

As illustrated in the exemplary embodiment of FIG. 2, the transmitting fiber optic terminal 2-1 comprises a signal source 6 connected via a multiplexing unit 7 to a booster amplifier 8 integrated in the transmitting fiber optic terminal 2-1. The output of the booster amplifier 8 is connected to a signal output 9 of the transmitting fiber optic terminal 2-1.

The receiving fiber optic terminal 2-2 comprises on the far end side of the optic fiber span 3 a signal input 10 connected to an integrated preamplifier 11. The output of the preamplifier 11 is connected via a demultiplexing unit 12 to a receiver 13 of the respective optical channel.

In a possible embodiment, a fiber optic terminal 2 of the fiber optic system 1 can comprise a transmitting fiber optic terminal 2-1 as well as a receiving fiber optic terminal 2-2.

In a possible embodiment, the signal parameter such as the optical signal power of an optical signal OS transported through the optical fiber span 3 from the transmitting fiber optic terminal 2-1 having a signal output 9 connected to a first end of the optical fiber span 3 to the receiving fiber optic terminal 2-2 having a signal input 10 connected to the second remote end of the optical fiber span 3 is measured continuously by the optical power detector 4 at the transmitting fiber optic terminal 2-1 and by an optical power detector 5 at the receiving fiber optic terminal 2-2 to provide sampled signal parameter values, e.g. sampled optical power values of the transmitted and received optical signal. The signal parameter value such as the optical power measured by the optical power detector 4 of the transmitting fiber optic terminal 2-1 can be communicated to the receiving fiber optic terminal 2-2 via an out-of-band communication channel, for instance by an optic supervisory channel OSC. In a possible embodiment, an evaluation software can compute a signal parameter value such as an optical span loss on the basis of the measured signal parameter value at the transmitting and receiving end of the optical fiber span 3.

In a possible embodiment, signal parameter values such as the optical power span loss SL is calculated continuously by subtracting the current sampled signal parameter value of the received optical signal from the sampled current signal parameter value of the transmitted optical signal. The signal parameter difference, in particular the optical power span loss difference, can then be determined continuously by comparing the previous signal parameter value, i.e. previous optical power span loss, from the current signal parameter value i.e. current optical power span loss. In order to catch sub 1 second transients with a reasonable accuracy a computation can be performed in a possible embodiment constantly at least every 10 milliseconds.

In a preferred embodiment, if the predetermined number of consecutively determined signal parameter differences, e.g. optical span loss differences, is lower than a signal parameter difference threshold, e.g. a span loss difference threshold, a steady state signal parameter, e.g. a steady state span loss SL-STEADY STATE, is computed on the basis of the consecutively determined signal parameter values. If a signal parameter such as an optical power at the receiving side is measured at time interval t the subsequent measurement can be performed at a time t+1. In a possible implementation, it is possible to save x timetime intervals of signal parameter calculations in a volatile circular buffer. Each new signal parameter calculation can be compared to the previous value and the signal parameter difference can be computed and stored in the buffer. The signal parameter comprises in a possible embodiment a span loss, SL.

$$SL\text{-}DIFF = SL_t - SL_{t+1}$$

Accordingly, in this embodiment, the optical power span loss difference SL-DIFF is determined continuously by comparing a previous optical span loss from a current optical span loss. If a predetermined number of consecutively determined optical span loss differences is lower than a predetermined span loss difference threshold a steady state span loss can be computed on the basis of the last consecutively determined optical span losses.

Figure 5:
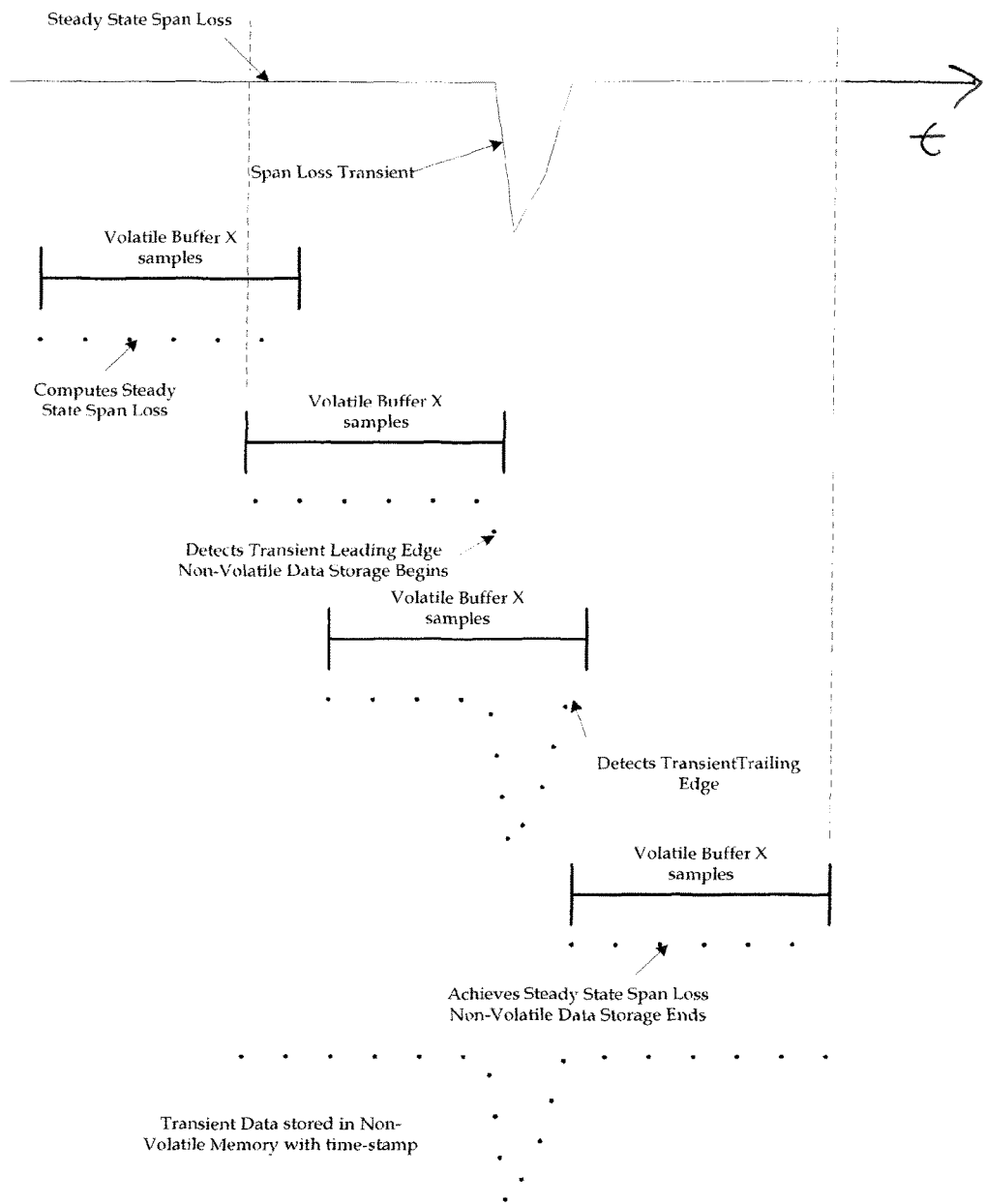
FIG. 5 shows a schematic timing diagram for illustrating the operation of a possible exemplary embodiment of a method and apparatus for logging transient events of an optical fiber span with a fiber optic system according to the present invention.

FIG. 5 illustrates schematically a timing diagram of a possible exemplary embodiment of the method according to the first aspect of the present invention. On the basis of measured samples which can be stored in a volatile buffer a steady state signal parameter such as a steady state span loss can be computed if a predetermined number of consecutively calculated optical signal parameter differences is lower than a predetermined signal parameter difference threshold. If a transient leading edge is detected a non-volatile data storage is started as illustrated in FIG. 5. The leading edge transient event can be detected if the determined signal parameter difference exceeds a predetermined signal parameter difference threshold. A trailing edge transient event can be detected if the calculated difference between the computed steady state signal parameter and the current optical signal parameter value is lower than a predetermined signal parameter difference threshold. The signal parameter is in a possible embodiment a span loss, SL. As soon as the steady state signal parameter is achieved the non-volatile data storage is stopped as illustrated in FIG. 5. The leading edge transient event and the trailing edge transient event are automatically time-stamped in a preferred embodiment using a fiber optic terminal clock of the system 1. The time-stamped transient events can be stored in a preferred embodiment in a non-volatile memory of the fiber optic system. This non-volatile memory can be integrated in a fiber optic terminal 2 of the fiber optic system. The non-volatile memory can also be integrated in a separate device of the fiber optic system 1. The time-stamped transient events stored in the non-volatile memory are correlated in a preferred embodiment with each other and/or with other time-stamped events observed within the same fiber optic system 1 to find a root cause of a short-term fault having occurred in the respective fiber optic system 1.

Figure 6:
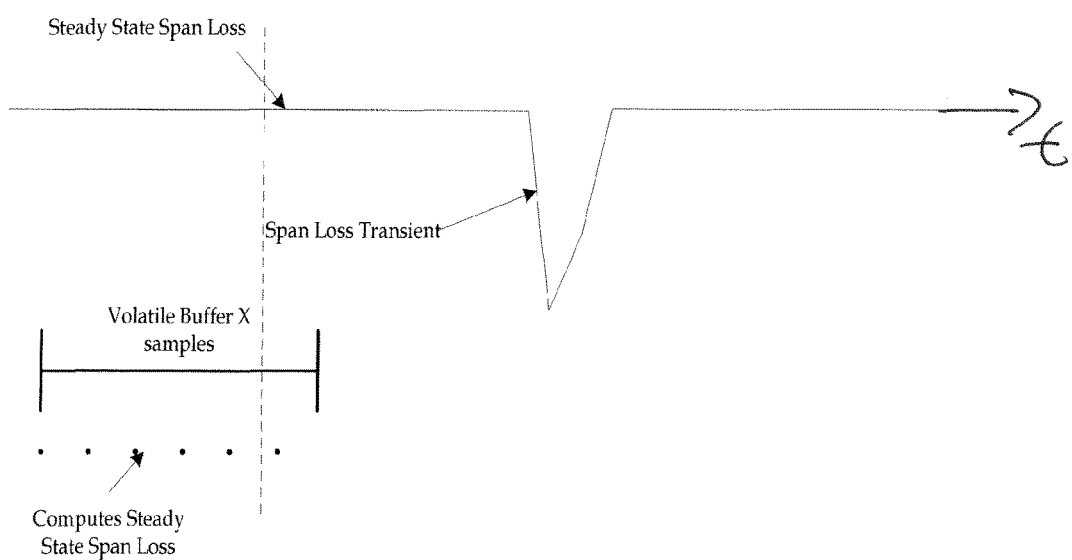
FIG. 6 shows a further schematic timing diagram for illustrating the operation of a possible exemplary implementation of a method and apparatus for logging transient events of an optical fiber span with a fiber optic system.

FIG. 6 shows a schematic timing diagram to illustrate how a steady state span loss as an example of a steady state signal parameter can be determined in a possible implementation. In the illustrated embodiment, as soon as x consecutive values of optical power span loss difference are lower than a threshold of e.g. 0.5 dB, a steady state span loss can be computed:

$$SL_{STEADY\ STATE} = AVG(SL_{t1}:SL_{t1+x})$$

Accordingly, in the illustrated embodiment, the steady state span loss SL-STEADY STATE is computed by calculating an average value of all span losses SL between sampling time t1 and sampling time t1+x. Subsequent values of the span loss differences are computed and stored along with associated span loss values until the span loss difference exceeds a predetermined span loss difference threshold of e.g. 0.5 dB. At this point, the leading edge of a transient event has been detected.

Figure 7:
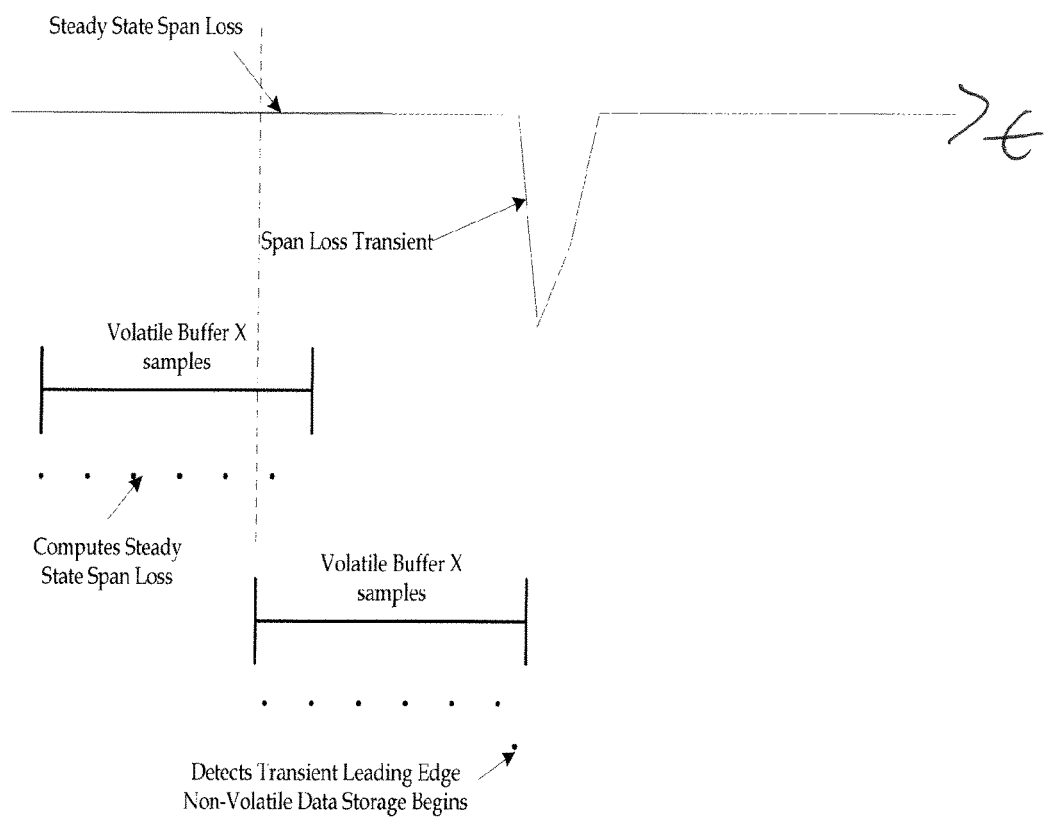
FIG. 7 shows a further schematic timing diagram for illustrating a possible exemplary implementation of a method and apparatus for logging transient events of an optical fiber span with a fiber optic system according to the present invention.

As illustrated in FIG. 7, if a transient leading edge has been detected a non-volatile data storage begins.

x values of span losses stored in the circular buffer can be dumped in a possible embodiment into a non-volatile memory along with subsequent span loss computations which can all be time-stamped by using a FOT clock until the trailing edge of the transient event has been detected. This occurs in a possible embodiment when:

$$SL_{STEADY\ STATE} - SL_{tn} < 0.5\ dB.$$

Figure 3:
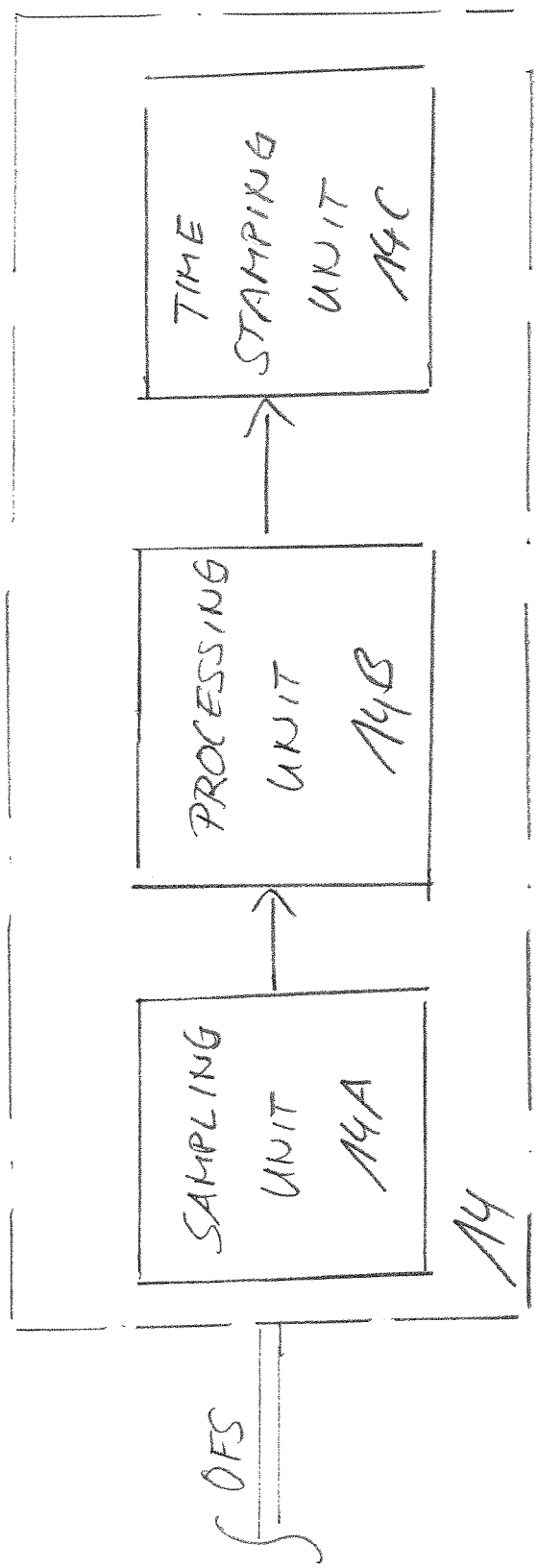
FIG. 3 shows a block diagram of a possible exemplary embodiment of an apparatus for logging transient events of an optical fiber span within a fiber optic system according to a second aspect of the present invention.

FIG. 3 shows a block diagram of a possible exemplary embodiment of an apparatus 14 for logging transient events of an optical fiber span 3 within a fiber optic system 1 according to an aspect of the present invention. The logging apparatus 14 can be integrated in a possible exemplary embodiment in a fiber optic terminal 2 of the fiber optic system 1. In an alternative embodiment, the logging apparatus 14 can be integrated in a separate device of the fiber optic system 1. In the illustrated embodiment, the apparatus 14 comprises a sampling unit 14A adapted to sample measured values of at least one signal parameter of an optical signal OS transported through an optical fiber span 3 of the fiber optic system 1. The apparatus 14 further comprises a processing unit 14B adapted to process the sampled measurement values to detect an occurrence of a transient event during transport of the optical signal OS through the optical fiber span 3. The apparatus 14 further comprises a time-stamping unit 14C adapted to provide each detected transient event with a time stamp TS. The detected transient events having been provided with time stamps can be used for correlation with each other and/or with other monitored events within the same fiber optic system 1.

Figure 4:
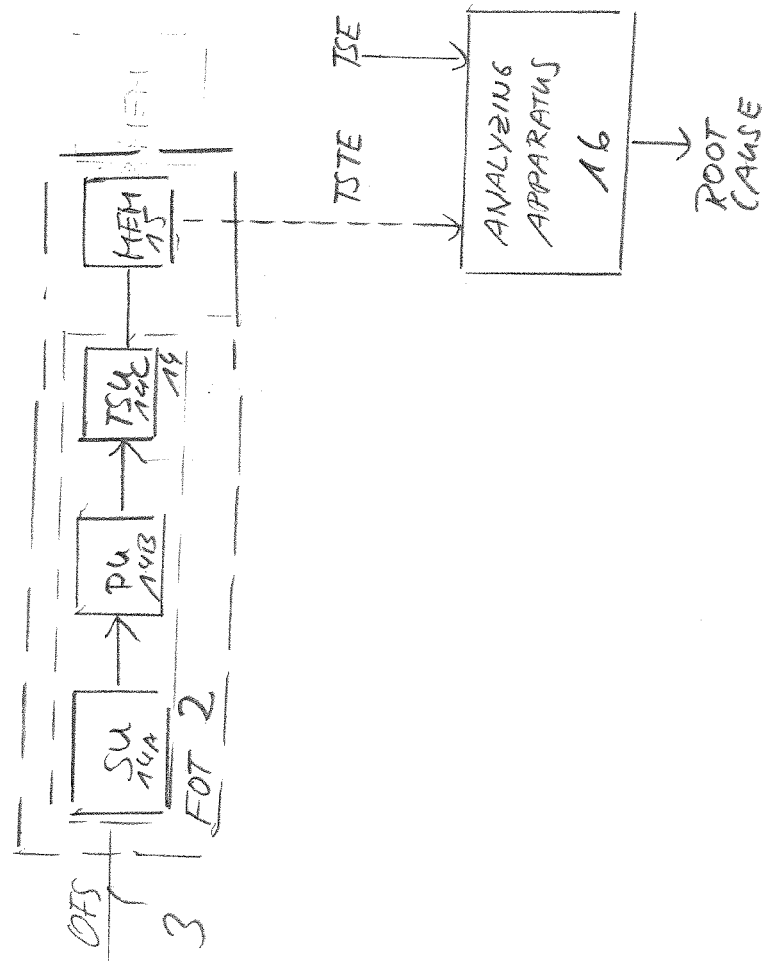
FIG. 4 shows a schematic diagram for illustrating a possible exemplary embodiment of a fiber optic system according to a further aspect of the present invention.

FIG. 4 shows schematically a possible exemplary embodiment of a fiber optic system 1 according to a further aspect of the present invention. In the illustrated embodiment, the logging apparatus 14 is integrated in a fiber optic terminal 2 of the fiber optic system 1. In the illustrated embodiment, the fiber optic terminal 2 further comprises a local non-volatile memory 15 adapted to store the time-stamped transient events of an optical fiber span 3 output by the time-stamping unit 14C. In the illustrated embodiment, the fiber optic system 1 comprises an analyzing apparatus 16 comprising a calculation unit or a processor adapted to correlate the time-stamped transient events of the optical fiber span 3 with other observed time-stamped events within the same fiber optic system 1 to detect a root cause of a short-term fault having occurred in the fiber optic system 1.

The calculation unit of the analyzing apparatus 16 has access in the illustrated embodiment to the local non-volatile memory 15 of the fiber optic terminal 2 to correlate the time-stamped transient events TSTE of the optical fiber span 3 with other observed time-stamped events TSE of the fiber optic system 1. With the method and apparatus according to the present invention, it is possible to continuously measure, detect and record time-stamped span loss transient events within the fiber optic system 1. The stored information enables correlation between span loss transient events and other monitored events, for instance BER, bit error rate, degradation events within the fiber optic communication network 1. In a possible embodiment, the fiber optic system 1 can comprise a DWDM optic system. The detection, and recording of time-stamped span loss transient events within a memory storage of a fiber optic terminal 2 allows correlation of the time-stamped transient events with other monitored degradation events of the same fiber optic system 1.

When a user of a fiber optic system 1 such as a DWDM equipment of the fiber optic system 1 does experience for instance a bit error rate, BER, degradation event a root cause analysis can be performed using an analyzing apparatus 16 as illustrated in FIG. 4. This root cause analysis allows to determine where the event has occurred and what remedies are available to prevent a reoccurrence of this event. The root cause can be a span loss transient. The method and apparatus according to the present invention provide means to continuously detect and record time-stamped span loss transient events within a DWDM equipment of the fiber optic system 1 enabling correlation with other monitored degradation events within the same fiber optic system 1. Positive time correlation between span loss transient events and other monitored events such as BER degradation events allows to focus the remedy properly on the outside fiber plant.

When a root cause analysis for an observed degradation event begins the span loss transient events stored in the non-volatile memory on the fiber optic terminal 2 can be retrieved. Since the degradation events and the span loss transient events have been time-stamped by the time-stamping unit 14C of the logging apparatus 14 the time-stamped span loss transient events and the degradation events can be easily compared with each other. Concurrency between transient events and degradation events allows to find a root cause in the outer fiber plant stability. Root cause analysis allows to detect whether a service level agreement SLA has been fulfilled by the operator of the fiber optic system 1.

The invention claimed is:

1. A method for logging transient events of an optical fiber span, OFS, within a fiber optic system, the method comprising the steps of:
   sampling measured values of at least one signal parameter of an optical signal transported through said optical fiber span, OFS;
   processing the sampled measurement values to detect an occurrence of a transient event during transport of the optical signal through said optical fiber span, OFS; and
   providing each detected transient event with a time stamp for correlation with other monitored events within said fiber optic system,
wherein a signal parameter difference is determined continuously by comparing a previous signal parameter value from a current signal parameter value, and
wherein if a predetermined number of consecutively determined signal parameter differences is lower than a signal parameter difference threshold a steady state signal parameter is computed on the basis of the consecutively determined signal parameters.

2. The method according to claim 1 wherein the detected transient event comprises a span loss transient event of the optical fiber span, OFS.

3. The method according to claim 2 wherein the span loss transient event of the optical fiber span, OFS, comprises an optical power transient event of the optical fiber span, OFS.

4. The method according to claim 1 wherein the signal parameter of the optical signal transported through said optical fiber span, OFS, comprises an optical signal power of the optical signal and/or a polarization of the optical signal and/or a signal to noise ratio, SNR and/or a Q-factor and/or an optical power span loss, SL.

5. The method according to claim 4 wherein the signal parameter of an optical signal transported through said optical fiber span, OFS, from a transmitting fiber optic terminal, FOT, connected to a first end of said optical fiber span to a receiving fiber optic terminal, FOT, connected to a second end of said optical fiber span is measured continuously at the transmitting fiber optic terminal, FOT, and/or at the receiving fiber optic terminal, FOT, to provide sampled signal parameter values of the transmitted and/or received optical signal.

6. The method according to claim 5 wherein the signal parameter is calculated continuously by subtracting the current sampled signal parameter value of the received optical signal from the sampled current signal parameter value of the transmitted optical signal.

7. The method according to claim 1 wherein a leading edge transient event is detected if the determined signal parameter difference exceeds the signal parameter difference threshold.

8. The method according to claim 1 wherein a trailing edge transient event is detected if the calculated difference between the computed steady state signal parameter and the current signal parameter value is lower than the signal parameter difference threshold.

9. The method according to claim 7 wherein the leading edge transient event and/or the trailing edge transient event are automatically time-stamped using a fiber optic terminal, FOT, clock.

10. The method according to claim 1 wherein the time-stamped transient events are stored in a non-volatile memory.

11. The method according to claim 10 wherein the time-stamped transient events are correlated with each other and/or with other time-stamped events observed within the fiber optic system to find a root cause of a short-term fault having occurred in the fiber optic system.

12. The method according to claim 11 wherein the other observed time-stamped events comprise bit error rate, BER, degradation events.

13. An apparatus for logging transient events of an optical fiber span, OFS, within a fiber optic system,
said apparatus comprising one or more processors implemented in circuitry, the one or more processors comprising a sampling unit, a processing unit and a time-stamping unit, wherein:
the sampling unit is adapted to sample measured values of at least one signal parameter of an optical signal transported through said optical fiber span, OFS;
the processing unit is adapted to process the sampled measurement values to detect an occurrence of a transient event during transport of the optical signal through said optical fiber span, OFS; and
the time-stamping unit is adapted to provide each detected transient event with a time stamp for correlation with other monitored events within the same fiber optic system,
wherein a signal parameter difference is determined continuously by comparing a previous signal parameter value from a current signal parameter value, and
wherein if a predetermined number of consecutively determined signal parameter differences is lower than a signal parameter difference threshold a steady state signal parameter is computed on the basis of the consecutively determined signal parameters.

14. A fiber optic system comprising:
at least one apparatus configured to log transient events of an optical fiber span, OFS, within the fiber optic system,
said apparatus comprising one or more processors implemented in circuitry, the one or more processors comprising a sampling unit, a processing unit and a time-stamping unit:
wherein the sampling unit is adapted to sample measured values of at least one signal parameter of an optical signal transported through said optical fiber span, OFS;
wherein the processing unit is adapted to process the sampled measurement values to detect an occurrence of a transient event during transport of the optical signal through said optical fiber span, OFS; and
wherein the time-stamping unit is adapted to provide each detected transient event with a time stamp for correlation with other monitored events within the same fiber optic system,
wherein a signal parameter difference is determined continuously by comparing a previous signal parameter value from a current signal parameter value, and
wherein if a predetermined number of consecutively determined signal parameter differences is lower than a signal parameter difference threshold a steady state signal parameter is computed on the basis of the consecutively determined signal parameters.

15. The fiber optic system according to claim 14 comprising a non-volatile memory adapted to store the time-stamped transient events of an optical fiber span, OFS, output by said time-stamping unit and other time-stamped events observed within the same fiber optic system.

16. The fiber optic system according to claim 15 comprising an analyzing apparatus having a calculation unit adapted to correlate the time-stamped transient events of the optical fiber span with other observed time-stamped events within said fiber optic system to detect a root cause of a short-term fault having occurred in the fiber optic system.

* * * * *